(12) United States Patent
Kato

(10) Patent No.: US 7,528,986 B2
(45) Date of Patent: May 5, 2009

(54) IMAGE FORMING APPARATUS, IMAGE FORMING METHOD, PROGRAM THEREFOR, AND STORAGE MEDIUM

(75) Inventor: Masahiro Kato, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 748 days.

(21) Appl. No.: 11/067,664

(22) Filed: Feb. 28, 2005

(65) Prior Publication Data
US 2005/0231766 A1 Oct. 20, 2005

(30) Foreign Application Priority Data
Apr. 15, 2004 (JP) ............................. 2004-120207

(51) Int. Cl.
*H04N 1/40* (2006.01)
(52) U.S. Cl. .................................... 358/1.18; 358/1.16
(58) Field of Classification Search .................. 358/1.9, 358/2.1, 1.2, 1.15–1.18
See application file for complete search history.

(56) References Cited

U.S. PATENT DOCUMENTS
5,369,716 A * 11/1994 Sangu ........................ 382/317

FOREIGN PATENT DOCUMENTS
| JP | 02257212 A | * | 10/1990 |
| JP | A 8-22535 | | 1/1996 |
| JP | 11066231 A | * | 3/1999 |
| JP | A-2002-112010 | | 4/2002 |
| JP | A-2003-189027 | | 7/2003 |

* cited by examiner

*Primary Examiner*—Thomas D Lee
*Assistant Examiner*—Stephen M Brinich
(74) *Attorney, Agent, or Firm*—Oliff & Berridge, PLC

(57) ABSTRACT

The image forming apparatus comprises an image reading device that reads a manuscript and generating a manuscript image data, and a command input device that inputs a command. A layout analysis device is provided for analyzing a layout of an image expressed by the manuscript image data. A controller is provided which, when a command is inputted trough the command input device, decides a page order for horizontally or vertically juxtaposed pages based on a result of analysis by the layout analysis device. An image splitting device generates split image data expressing two horizontally or vertically split images of the manuscript image data, and outputs the split image data in accordance with the order that is decided by the controller.

4 Claims, 5 Drawing Sheets

(a) SPREAD MANUSCRIPT IMAGE (b) LINE SEGMENT EXTRACTED IMAGE (c) RESULT OF LINE SEGMENT AREA LAYOUT ANALYSIS a) SPREAD MANUSCRIPT
(b) ORDER OF CONTINUOUS PAGE COPYING (a) SPREAD MANUSCRIPT
(b) ORDER OF CONTINUOUS PAGE COPYING

IMAGE FORMING APPARATUS, IMAGE FORMING METHOD, PROGRAM THEREFOR, AND STORAGE MEDIUM

BACKGROUND OF THE INVENTION

1. Field of the Invention

The present invention is related to an image forming apparatus, an image forming method, program and storing medium used for separately forming images of horizontally or vertically juxtaposed pages of a spread manuscript.

2. Description of the Related Art

Some of conventional copy machines are known to have a function so-called "page continuous copying" enabling to provide copies of images for respective horizontally or vertically juxtaposed pages of a spread manuscript, or to generate and store (called "to scan" hereinafter) image data for the respective pages. In the page continuous copying function, the copying machine horizontally or vertically splits a retrieved image of the spread manuscript and prints them on respective separate sheets. Or if the machine has the scanning function, it generates and stores image data respectively expressing the split images.

A technique is proposed for rearranging the images retrieved using the page continuous copying function in a page order. For example, it is known to provide an electronic filing system that contents of which are hereby incorporated by reference, a page number is assigned to each of retrieved images of a bound manuscript in a descending order when the manuscript is read from the bottom page to the top, and the images of the manuscript are stored with the assigned corresponding page numbers. Thus, even when the reading order is different from the page order of the manuscript, the images of the manuscript can be correctly stored in a page order.

However, in the technique described above, it is necessary for a user to input a command indicating a storing order of the manuscript images depending on how the manuscript is bound.

SUMMARY OF THE INVENTION

The present invention is established in view of the above described background, and provides a technique for an image forming apparatus having a page continuous copying function, which separately forms images of respective horizontally or vertically juxtaposed pages of a spread manuscript, to judge a manuscript page order and form images or store image data in accordance with the manuscript page order.

An image forming apparatus according to the invention is furnished with: an image reading device that reads a manuscript and generating a manuscript image data; a command input device that inputs a command; a layout analysis device for analyzing a layout of an image expressed by the manuscript image data; a controller that, when a command is inputted trough the command input device for forming separate images for horizontally or vertically juxtaposed pages of a spread manuscript, decides a page order for the horizontally or vertically juxtaposed pages based on a result of analysis by the layout analysis device; and an image splitting device that generates split image data expressing two horizontally or vertically split images of the image expressed by the manuscript image data, and outputting the split image data in accordance with the order decided by the controller.

BRIEF DESCRIPTION OF THE DRAWINGS

Embodiments of the present invention will be described in detail based on the following figures, wherein.

DETAILED DESCRIPTION OF THE INVENTION

An embodiment of the present invention will be described with reference to the attached drawings.

Figure 1:
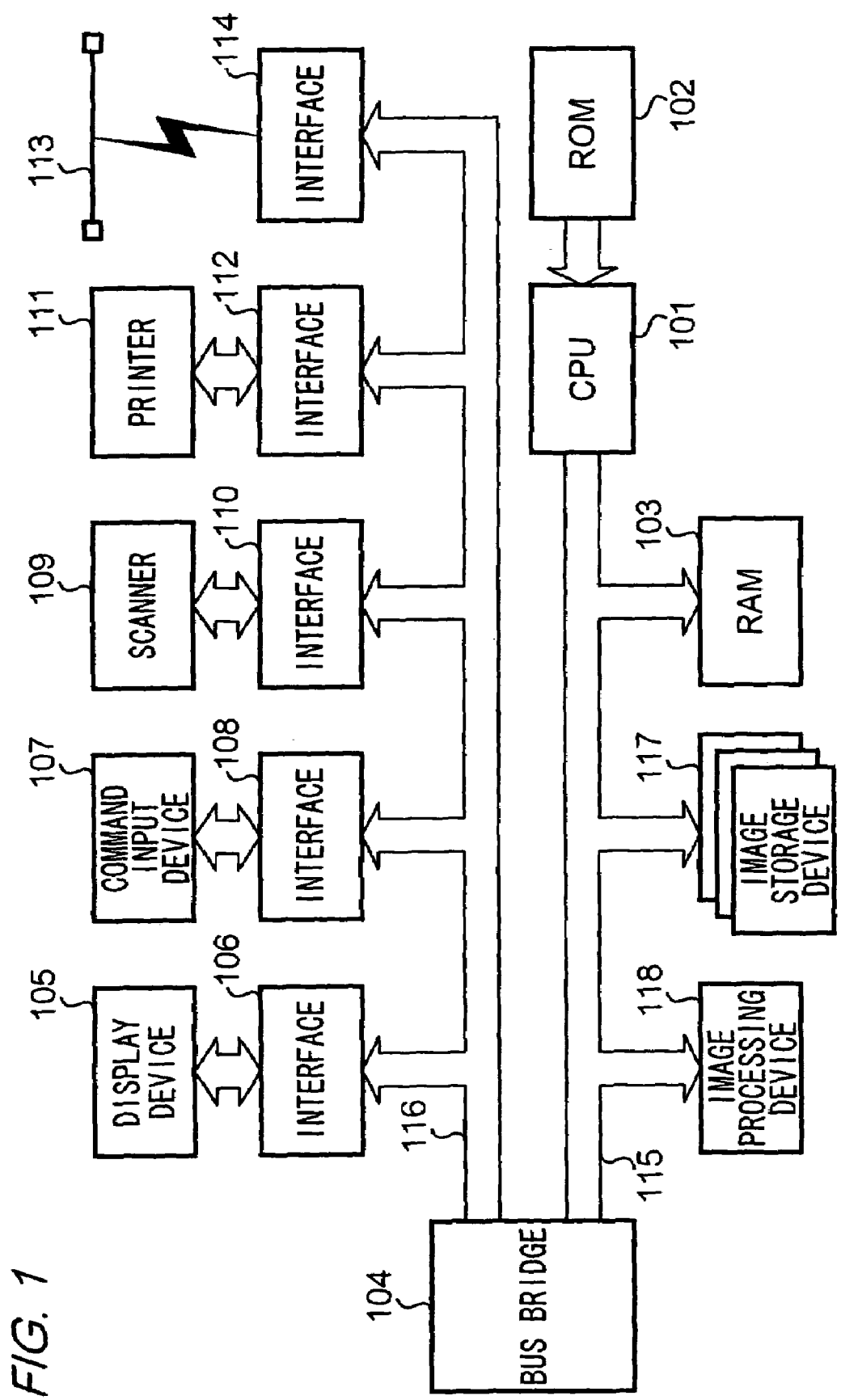
FIG. 1 illustrates a construction of the image forming apparatus according to the present invention.

FIG. 1 illustrates a construction of the image forming apparatus 10 according to the present invention. A ROM (Read Only Memory) 102 is installed with a program or data used for controlling the image forming apparatus 10, and a CPU (Central Processing Unit) 101 is provided for controlling the performance of each part of image forming apparatus 10 by reading out the program stored in ROM 102, deploying it on a RAM (Random Access Memory) 103, and executing it. An image storage device 117 comprises, for example, a hard disk driver for storing therein image data or the like. Construction of an image processing device 118 will be described hereinafter. CPU 101, RAM 103, image storage device 117, and image processing device 118 are respectively connected to a bus 115 that enables high speed data transmission.

Various peripheral devices are connected to the other bus 116. A display device 105 comprises, for example, a liquid crystal panel, CRT (Cathode Ray Tube), or the like, and displays operation menus or the like. A command input device 107 comprising a keyboard, mouse, digitizer, or the like, is used for inputting commands for operating image forming apparatus 10. A scanner or image reading device 109 is provided for reading a manuscript and generating a multi-valued image data expressing a multiple gradation image. A printer (processing device) 111 forms images on a surface of a recording sheet based on the image data using an electrophotographic or ink jet technology. Display device 105, command input device 107, scanner 109, and printer 111 are connected to bus 116 through respective interfaces 106, 108, 110, 112. Bus 116 is also connected to a network 113 through interface 114 so that image forming apparatus 10 can send and receive data to and from outside systems. These buses 115, 116 are mutually connected through a bus bridge 104.

Figure 2:
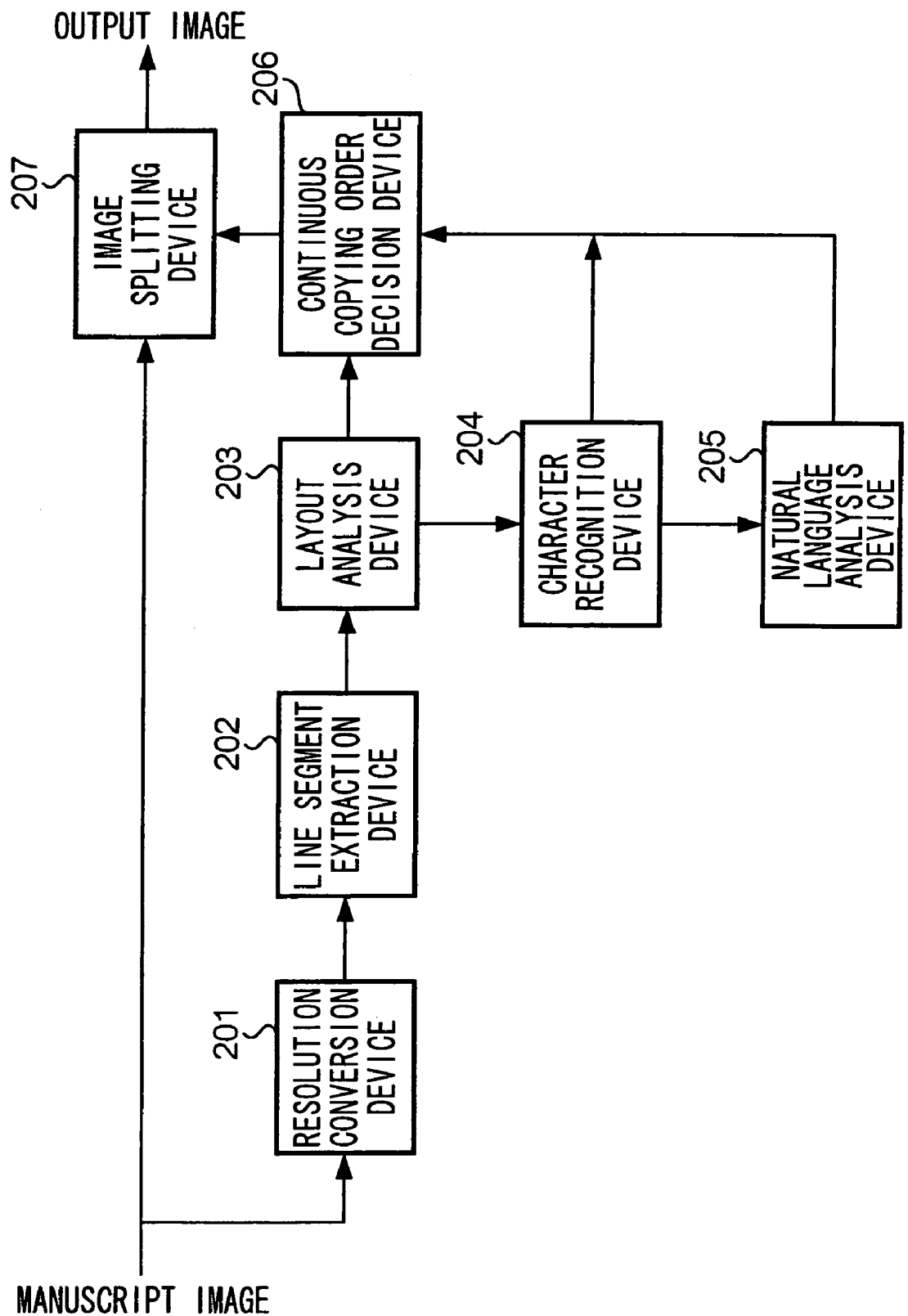
FIG. 2 schematically illustrates a construction of the image processing device according to the present invention.

FIG. 2 illustrates the construction of the image processing device 118. The devices described hereafter are modules virtually created by the CPU 101 when executing a program.

A resolution conversion device 201 is provided for receiving the manuscript image data generated by scanner 109 and lowering the resolution of the manuscript image data to a minimum resolution level to maintain a necessary amount of information for performing a layout analysis at a layout analysis device 203 at later stages. By performing this resolution lowering process, the process at the later stages can be performed at a higher speed.

A line segment extraction device 202 is provided for extracting pixels constituting a line segment from the image data and generating a line segment image data. More specifically, line segment extraction device 202 receives the manuscript image data with a resolution lowered by resolution conversion device 201, and extracts pixels constituting the line segment from the manuscript image data. This extraction process will be schematically described hereinafter.

To start with, binarization of a multi-valued image is performed. In the binarization process, an average pixel value of the pixels contained in a predetermined range of area surrounding the target pixel is calculated first. Then, if the difference between the pixel value of the target pixel and the calculated average pixel value is equal to or larger than a predetermined threshold value, the pixel value for the target pixel is set as "1", and if the difference is smaller than the threshold value, the pixel value for the target pixel is set as "0". Since line segments construct components such as characters, line drawings or tables, a pixel value of the pixel constituting these components is clearly different from the pixels constituting the background components, in most cases. Meanwhile, photographs or pictures are constructed from pixels having various gradations so that the pixel value difference between the target pixel and the circumferential pixels is smaller. Therefore, by setting a proper threshold, it is possible to distinguish line segments from others such as photographs or pictures.

After performing this process for all the pixels, extraction of connected pixels is performed using a known labeling processing. In the extraction of the connected pixels, pixels constituting the binarized image data are sequentially scanned, and if a pixel having pixel value "1" is found, it is examined if another pixel having pixel value "1" exists in the vicinity of the target pixel, and the neighboring pixels having pixel value "1" are bestowed with the same labeling value.

Then a rectangle circumscribing the pixel group bestowed with the same label value is formed, and if the dimension of the circumscribing rectangle is equal to or smaller than a predetermined threshold, then the pixel value of the pixels constituting the pixel group is changed into "0". This process eliminates noises.

In this embodiment, the pixel group bestowed with the same labeling value in the above-described manner is deemed as a line segment, and an image constructed by these line segments is called a line segment image. And an image data expressing the line segment image is called a line segment image data.

The above-described method for extracting line segments is described in detail in the Japanese Laid-open Patent Publication 2002-175532, contents of which are hereby incorporated by reference.

Layout analysis device 203 is provided for analyzing the layout of the line segment image expressed by the line segment image data, and categorizing the components of the line segment image into text areas comprising character strings, drawing areas comprising line drawings, and table area comprising tables. In the present embodiment, a known layout analysis method is used. In the layout analysis, feature quantities, such as position, dimension, configuration, density, or projection distribution, of the connected pixels constituting the line segment image and extracted as described above, are measured, and the connected pixels are categorized under a rule prescribed by a predetermined threshold value or the like. The techniques of the layout analysis is explained in detail, for example, in Japanese Laid-open Patent Publication H09-91450, the contents of which are herein incorporated by reference.

Layout analysis device 203 comprises an erection device for judging an erected state of the manuscript. More specifically, character recognition is performed using a known character recognition device 204 to the text area that is extracted by layout analysis device 203 in various directions. And the erection direction of the manuscript image is decided based on a direction exhibiting the highest recognition rate.

Layout analysis device 203 also comprises a spreading direction judgment device for judging a direction in which the manuscript is spread. Since the border area between the pages of the spread manuscript receives less amount of light emitted from the light source of scanner 109 than other areas, a dark strip-shaped or line-shaped area is formed in the border area of the manuscript image. The spreading direction judgment device extracts this dark area from the manuscript, the erection direction of which is already identified, and decides the spreading direction based on the direction in which the dark area extends. This process can make judgment whether the manuscript is spread vertically or horizontally.

Layout analysis device 203 also comprises a page number extraction device for extracting a page number from the text area. More specifically, character strings are extracted for a potential page number from the areas categorized as text areas. Page numbers are usually allocated at the top or bottom corners on the unbound side, or the center of the bottom or so, so that the character strings in these regions are extracted as the potential page number. These character strings are recognized by character recognition device 204 and judged if they represent a page number. The judgment is made by making queries such as the character string is a numeral or not, or the horizontally or vertically neighboring numbers are sequential or not, etc.

The above-described line segment extraction device 202 and layout analysis device 203 constitute a component extraction device.

A natural language analysis device 205 is provided for judging if there is a contextual relationship between the text areas using known method such as morphemic analysis or syntax analysis, and extracting pairs of the text areas sharing such relationship. For example, if a text is split to constitute two text areas allocated to different pages, the former part of the text is allocated to the former page and the latter part is to the latter page. Or, a chapter number included in a heading or a table number added to a title of a diagram is also helpful to judge the contextual relationship. In the present embodiment, these contextual relationships are used to judge the page order of the two pages of the spread manuscript.

A continuous copying order decision device 206 is provided for judging the page order of the two pages of the spread manuscript based on an analysis result of the above-described layout analysis device 203, character recognition device 204, and natural language analysis device 205, and for generating data expressing the page order. Detail of the processing steps for judging the page order will be described in the following explanation of operation.

An image splitting device 207 is provided for generating a split image data expressing horizontally or vertically split images of the manuscript image, and supplying the split image to printer 111.

The operations of the above-constructed image forming apparatus 10 will be described hereinafter. Since CPU 101 performs the following operations through execution of a program, these operations are explained as actions of CPU 101.

Figure 3:
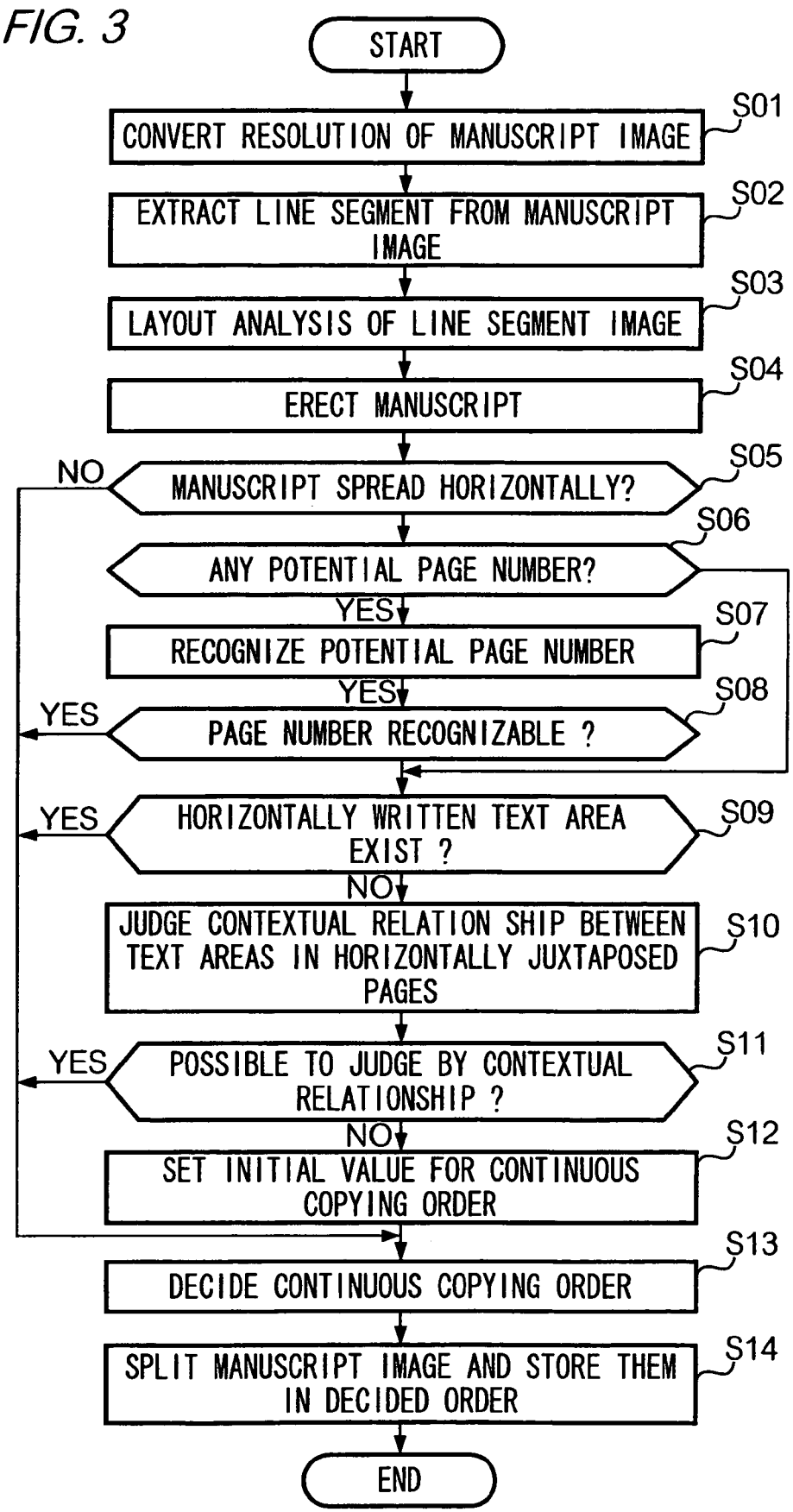
FIG. 3 illustrates a flowchart of processing performed by the CPU according to the present invention.

FIG. 3 is a flowchart of the processes performed by CPU 101. Here, it is assumed that a user has already inputted a command for performing page continuous copying through command input device 107, and scanner 109 has scanned a spread manuscript and generated the manuscript image data.

At the beginning, in step S01, CPU 101 converts resolution of the source image data generated by scanner 109 using resolution convert device 201. CPU 101 receives the manuscript image data generated by scanner 109 and lowers resolution of the manuscript image data to a minimum resolution enough to maintain necessary amount of information for executing the layout analysis in a layout analysis device 203 at a later stage. By executing this process, the following process can be performed at a higher speed.

Figure 4:
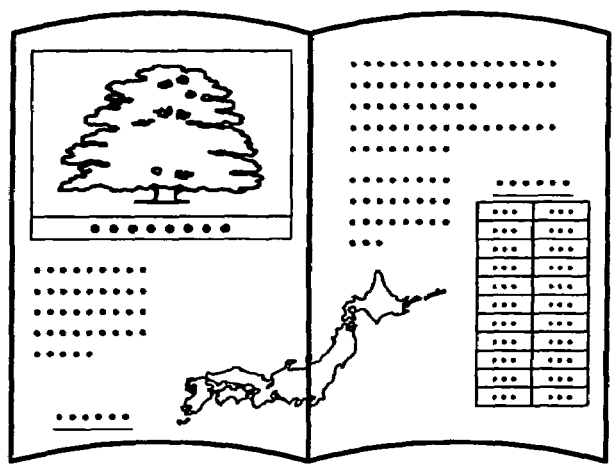
FIG. 4 schematically illustrates an example of a spread manuscript image processed by the apparatus according to the present invention.
Figure 4:
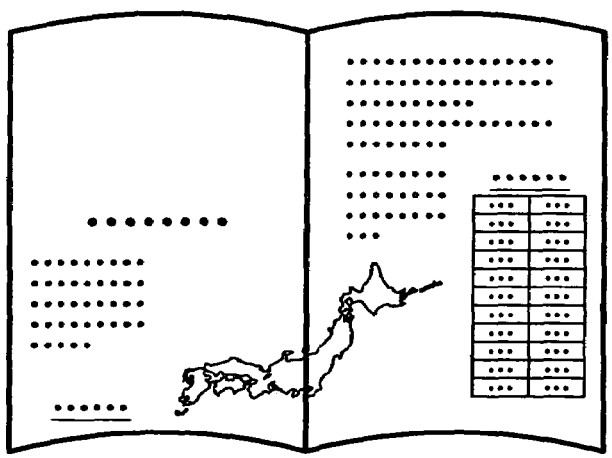
Figure 4:
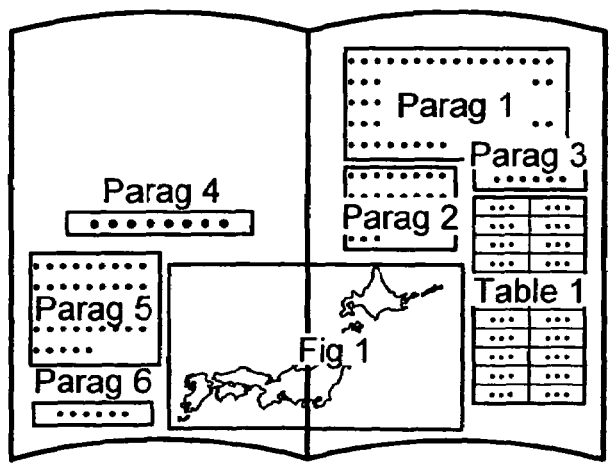

FIG. 4(*a*) illustrates an example of an image of the spread manuscript. In this example, a photograph is allocated in the upper area of left page, a line drawing is allocated in the lower area to span both right and left pages, and a table is allocated in the lower right area of right page. In other areas of these pages, plural flocks of texts are allocated.

In step S02, CPU 101 receives the manuscript image data, the resolution of which is lowered by resolution conversion device 201, and extracts pixels constituting a line segment from the manuscript image data and generates line segment image data using line segment extraction device 202. FIG. 4(*b*) is an example of a line segment image extracted through the above-described line segment extracting process. As illustrated in this figure, in the line segment image, a photograph allocated in the upper area of the right page is eliminated.

Then in step S03, CPU 101 analyzes the layout of the line segment image expressed by the line segment image data, using layout analysis device 203, and categorizes the components of the line segment image into text areas comprising character strings, drawing areas comprising line drawings, and table areas comprising tables.

FIG. 4(*c*) illustrates the result of the layout analysis of the line segment image. In the figure, "Parag 1", "Parag 2", "Parag 3", "Parag 4", "Parag 5", and "Parag 6" are all the text areas. Among these, "Parag 3", "Parag 4", and "Parag 6" are captions for photographs or graphics, and such captions will be also categorized in text areas. "FIG. 1" is a line drawing area comprising line drawings. "Table 1" is a table area comprising a table.

In step S04, CPU 101 judges the erection direction of the spread manuscript using the erection device and rotates the manuscript image to a direction in which the document is readable (erection direction). In step S05, CPU 101 decides the spreading direction in which the manuscript is spread using spreading direction judgment device. Thus, it is judged whether the manuscript is spread horizontally or vertically.

Figure 5:
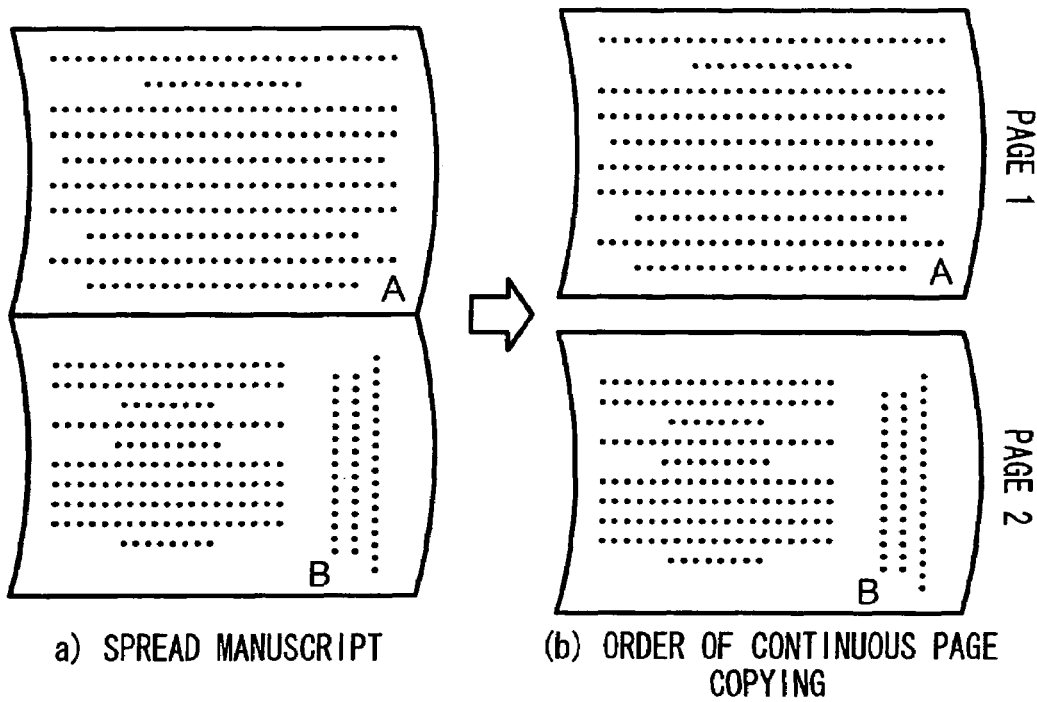
FIG. 5 schematically illustrates an example of a vertically spread manuscript processed by the apparatus according to the present invention.

If the manuscript is spread horizontally (step S05: YES), then CPU 101 proceeds to step S06. If the manuscript is spread vertically (step S05: NO), then CPU 101 proceeds to step S13. In step S13, CPU 101 generates a data expressing a page order. If the manuscript is spread vertically, as illustrated in FIG. 5, the upper page becomes the former page regardless of whether the manuscript is written horizontally or vertically, or what language is used, such as Japanese or English. Therefore, in this case, the upper page is decided as the former page.

In step S06, CPU 101 judges if there is a character string that can be a potential page number using the page number extraction device. If there is a potential page number (step S06: YES), then CPU 101 proceeds to step S07, and if there is no potential page number (step S06: NO), then CPU 101 proceeds to step S09. In step S07, CPU 101 recognizes the potential page number character string using character recognition device 204. And in step S08, CPU 101 judges whether the recognized character string is a page number. If it is a page number (step S08: YES), CPU 101 proceeds to step S13 to generate a data expressing a page order based on the recognized page number. If it is not a page number, then CPU 101 proceeds to step S09.

Figure 6:
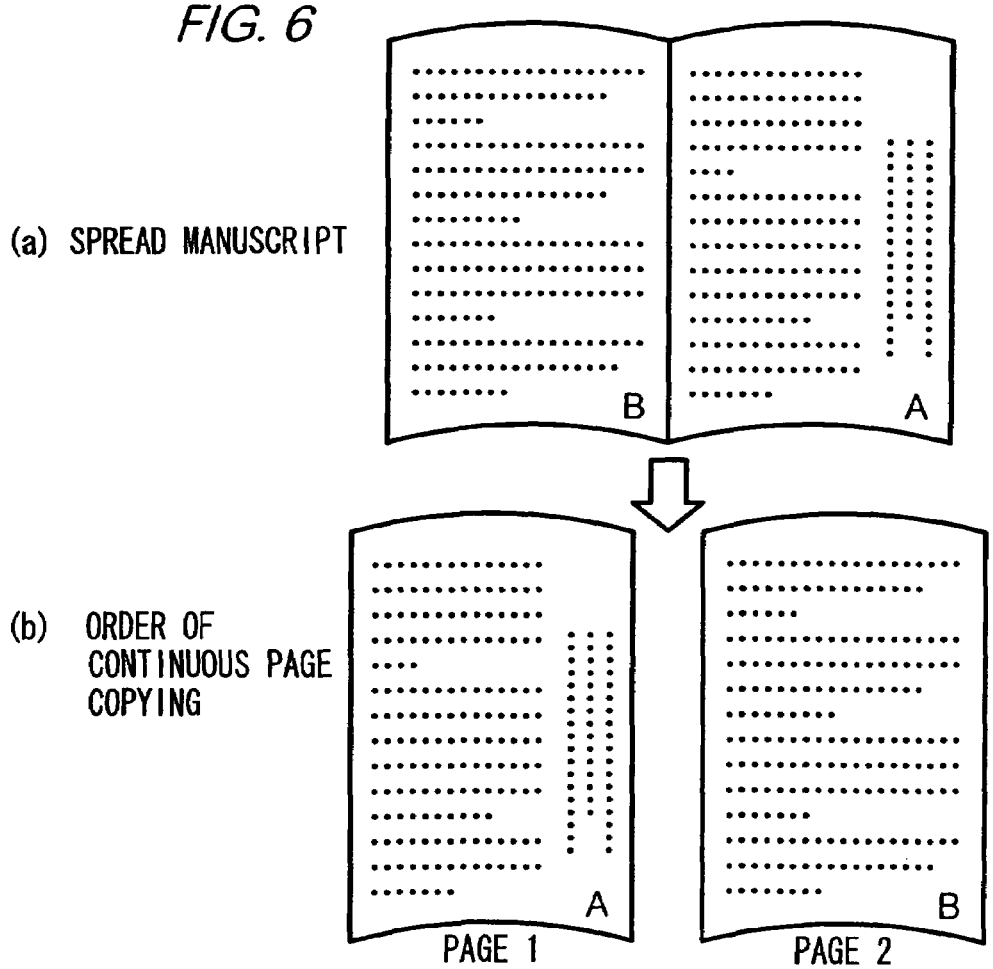
FIG. 6 schematically illustrates an example of a horizontally spread manuscript processed by the apparatus according to the present invention.

In step S09, CPU 101 judges if there is a vertical writing text area among the extracted text areas by layout analysis device 203. If it is positive, it means either that only the vertical writing text areas exist, or a mixed text area including both the vertical and horizontal writing text areas exists. If only the vertical writing text areas exist, the right side page is always the former page. If the mixed text area exists as illustrated in FIG. 6, the right side page is usually the former page. Thus, when vertical writing text areas exist (step S09: YES), CPU 101 proceeds to step S13 to generate a data expressing a page order by deciding the right side page as the former page. If there are no vertical writing text areas (step S09: NO), CPU 101 proceeds to step S11. However, when both vertical and horizontal writing text areas exist, different situation can exist other than the above-described case, so that the user can provide a predetermined order based on the actual document's page order, which is to be stored in image forming apparatus 10.

In step S10, CPU 101 judges contextual relationships between each of the text areas using natural language analysis device 205. In step S11, CPU 101 judges a page order based on the contextual relationships between the text areas. When text areas having a mutual contextual relationship separately exist on different two pages (step S11: YES), CPU 101 proceeds to step S13 to generate a data expressing a page order based on the contextual relationship of the text areas. When the page order cannot be judged, CPU 101 proceeds to step S12.

In step S12, CPU 101 decides the page order based on a predetermined rule, and proceeds to step S13 to generate a data expressing the page order. The predetermined rule may include, for example, a rule prescribing that the right side page precedes the left side page. The user can make those rules according to types of documents and store it in image forming apparatus 10 in advance.

In step S14, CPU 101 supplies the data expressing the page order generated in step S14 together with the manuscript image data to image splitting device 207. Image splitting device 207 generates split image data expressing split images of the manuscript image horizontally or vertically split in accordance with the page order data, and supplies the split image data to printer 111. Printer 111 forms images based on the split image data.

As described above, according to the present embodiment, when performing so-called page continuous copying to form separate images for horizontally juxtaposed pages of a spread manuscript, image formation or storage of the image data can be performed in a decided page order.

In the judgment of the page order, various judgment parameters such as a spreading direction, page numbers, a vertical or horizontal writing direction, and a contextual relationship between the text areas are used in a hierarchical fashion, so that a precise judgment can be performed without causing needless judgment processes.

The present invention can be implemented with various modifications, as exemplified in the following.

While, in the above-described embodiment, erection of the manuscript image is judged using a character recognition process, a layout analysis result can be also used. For example, characteristic values such as a position of the heading, a positional relationship between a diagram and its title can be used for judging erection of the manuscript image.

While, in the above-described embodiment, the image is formed using printer 111 according to a continuous copying method decided by continuous copying method decision device 206, the image can be processed to be stored in image storage device 117 as an image data expressing the image.

Also, image storage device 117 can be formed as a storage device that is connected to image forming apparatus 10 through network 113.

While, in the above-described embodiment, CPU 101 executes the program to perform the processing, hardware devices equipped with an equivalent function can construct image forming apparatus 10.

In the above-described image forming apparatus, the image reading device first reads a manuscript and generates a manuscript image data. When a command is inputted trough the command input device for forming separate images for the horizontally or vertically juxtaposed pages of the spread manuscript, the layout analysis device analyzes a layout of the manuscript image data. Then the controller decides a page order for the horizontally or vertically juxtaposed pages based on a result of analysis by the layout analysis device. Then the image splitting device generates split image data expressing two horizontally or vertically split images of the manuscript image, and outputs the split image data in accordance with the order decided by the controller.

In another embodiment of the invention, an image forming method comprises: reading a manuscript to generate a manuscript image data; when a command is inputted for forming separate images for horizontally or vertically juxtaposed pages of a spread manuscript, analyzing a layout of the manuscript image to decide a page order for the horizontally or vertically juxtaposed pages; and generating split image data expressing two horizontally or vertically split images of the image expressed by the manuscript image data and outputting the split image data in accordance with the page order.

In another embodiment of the invention, a program for having a computer to perform a function is provided, the function comprising: reading a manuscript to generate a manuscript image data; when a command is inputted for forming separate images for horizontally or vertically juxtaposed pages of a spread manuscript, analyzing a layout of the manuscript image to decide a page order for the horizontally or vertically juxtaposed pages; and generating split image data expressing two horizontally or vertically split images of the image expressed by the manuscript image data and outputting the split image data in accordance with the page order.

According to the embodiment, in an image forming apparatus equipped with a page continuous copying function to form separate images for each of the pages of a spread manuscript, it is possible to judge the page order and to form images or store image data for the pages in accordance with the page order.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be de defined by the following claims and their equivalents.

The entire disclosure of Japanese Patent Application No. 2004-120207 filed on Apr. 15, 2004 including specifications, claims, drawings and abstract is incorporated herein by reference in its entirety.

What is claimed is:

1. An image forming apparatus comprising:
    an image reading device that reads a manuscript and generates a manuscript image data;
    a command input device that inputs a command; and
    a layout analysis device that analyzes a layout of an image expressed by the manuscript image data, the layout analysis device comprising:
        an erection direction judgment device that judges an erection direction of the manuscript image;
        a spreading direction judgment device that judges a spreading direction of the manuscript by recognizing a border area between the pages of the manuscript image; and
        a page number extraction device that extracts a character string as a potential page number and judges whether the character string is a page number;
    the image forming apparatus further comprising:
    a controller that, on the condition that a command is inputted through the command input device for forming separate images for horizontally or vertically juxtaposed pages of a spread manuscript, decides a page order for the horizontally or vertically juxtaposed pages based on a result of analysis by the layout analysis device,
    wherein the controller decides an upper page as a former page under the condition that the manuscript is spread vertically according to the judgment result of the erection direction judgment device and the spreading direction judgment device,
    wherein the controller decides a page order based on the extracted page number under the condition that the spread manuscript is spread horizontally and under the condition that the page number is extracted,
    wherein, under the condition that the page number is not extracted, the controller judges whether there is any vertically written text area, and under the condition that the controller judges that there is vertically written text area, the controller decides a right side page is a former page, and
    wherein the controller judges, under the condition that only horizontally written text areas exist, the contextual relationship between the text areas separately existing in both of the horizontally juxtaposed pages and decides a page order based on the judgment result; and
    an image splitting device that generates split image data expressing two horizontally or vertically split images of the image expressed by the manuscript image data, and outputs the split image data in accordance with the order decided by the controller.

2. The image forming apparatus according to claim 1, wherein the controller decides a page order based on a predetermined rule under the condition that the contextual relationship between the text areas separately existing in both of the horizontally juxtaposed pages is not judged.

3. An image forming method comprising:
    reading a manuscript to generate a manuscript image data;
    analyzing a layout of the manuscript image to decide a page order for the horizontally or vertically juxtaposed pages on the condition that a command is inputted for forming separate images for horizontally or vertically juxtaposed pages of a spread manuscript, the analyzing a layout of the manuscript image comprising:
        judging an erection direction of the manuscript image;
        judging a spreading direction of the manuscript by recognizing a border area between the pages of the manuscript image;

extracting a character string as a potential page number and judging whether the character string is a page number, deciding an upper page as a former page under the condition that the manuscript is spread vertically according to the judged erection direction and the judged spreading direction, deciding a page order based on the extracted page number under the condition that the spread manuscript is spread horizontally and under the condition that the page number is extracted, judging whether there is any vertically written text area under the condition that the page number is not extracted, and deciding a right side page is a former page under the condition that it is judged that there is vertically written text area, and judging, under the condition that only horizontally written text areas exist, the contextual relationship between the text areas separately existing in both of the horizontally juxtaposed pages and deciding a page order based on the judgment result;

the image forming method further comprising:

generating split image data expressing two horizontally or vertically split images of the image expressed by the manuscript image data; and outputting the split image data in accordance with the page order.

4. A storage medium readable by a computer, the storage medium storing a program of instructions executable by the computer for performing a function, the function comprising:

reading a manuscript to generate a manuscript image data;

analyzing a layout of the manuscript image to decide a page order for the horizontally or vertically juxtaposed pages on the condition that a command is inputted for forming separate images for horizontally or vertically juxtaposed pages of a spread manuscript, the analyzing a layout of the manuscript image comprising:

judging an erection direction of the manuscript image;

judging a spreading direction of the manuscript by recognizing a border area between the pages of the manuscript image;

extracting a character string as a potential page number and judging whether the character string is a page number, deciding an upper page as a former page under the condition that the manuscript is spread vertically according to the judged erection direction and the judged spreading direction, deciding a page order based on the extracted page number under the condition that the spread manuscript is spread horizontally and under the condition that the page number is extracted, judging whether there is any vertically written text area under the condition that the page number is not extracted, and deciding a right side page is a former page under the condition that it is judged that there is vertically written text area, and judging, under the condition that only horizontally written text areas exist, the contextual relationship between the text areas separately existing in both of the horizontally juxtaposed pages and deciding a page order based on the judgment result;

the function further comprising:

generating split image data expressing two horizontally or vertically split images of the image expressed by the manuscript image data; and outputting the split image data in accordance with the page order.

* * * * *